(12) United States Patent
Jain et al.

(10) Patent No.: US 12,737,504 B2
(45) Date of Patent: Sep. 15, 2026

(54) ACCESS CONTROL SYSTEM AND A DATA STORAGE DEVICE

(71) Applicant: Sandisk Technologies, Inc., Milpitas, CA (US)

(72) Inventors: Mayur Dipchand Jain, Bangalore (IN); Rotem Sela, Milpitas, CA (US); Meenakshi C, Bangalore (IN); Danny Berler, Kfar Saba (IL); Kakumanu Ambika K, Yerrupalem (IN)

(73) Assignee: Sandisk Technologies, Inc., Milpitas, CA (US)

( * ) Notice: Subject to any disclaimer, the term of this patent is extended or adjusted under 35 U.S.C. 154(b) by 469 days.

(21) Appl. No.: 18/447,723

(22) Filed: Aug. 10, 2023

(65) Prior Publication Data

US 2024/0362370 A1 Oct. 31, 2024

Related U.S. Application Data

(60) Provisional application No. 63/462,526, filed on Apr. 28, 2023.

(51) Int. Cl.
*G06F 21/72* (2013.01)
*G06F 21/79* (2013.01)

(52) U.S. Cl.
CPC .............. *G06F 21/79* (2013.01); *G06F 21/72* (2013.01)

(58) Field of Classification Search
CPC .......... G06F 21/79; G06F 21/72; G06F 21/78; G06F 21/44; G06F 21/604; G06F 21/62; H04L 9/0819; H04L 9/0861; H04L 9/0866
See application file for complete search history.

(56) References Cited

U.S. PATENT DOCUMENTS

| | | | | |
|---|---|---|---|---|
| 11,088,845 | B2 | 8/2021 | Sela et al. | |
| 11,321,468 | B2 | 5/2022 | Cariello et al. | |
| 2019/0013081 | A1* | 1/2019 | Blodgett | H04L 9/0861 |
| 2019/0163913 | A1* | 5/2019 | Sun | G06F 12/1408 |
| 2020/0014544 | A1* | 1/2020 | Sela | G06F 21/79 |
| 2020/0210596 | A1* | 7/2020 | Cariello | G06F 21/79 |
| 2021/0203496 | A1* | 7/2021 | Cariello | G06F 12/1441 |
| 2021/0278979 | A1* | 9/2021 | Lee | H04L 63/126 |
| 2023/0289071 | A1* | 9/2023 | Jang | G06F 3/0659 |
| 2024/0028747 | A1* | 1/2024 | Gyllenskog | G06F 21/62 |

FOREIGN PATENT DOCUMENTS

WO 2013155963 A1 10/2013

OTHER PUBLICATIONS

"What Happens in a TLS Handshake", https://www.cloudflare.com/learning/ssl/what-happens-in-a-tls-handshake/.
Translation of WO 2013155963 A1 Su et al., "Translation Mobile Terminal Security Information Storage Method and System on the Basis of EMMC Chip", (2013).

* cited by examiner

*Primary Examiner* — Amie C. Lin
(74) *Attorney, Agent, or Firm* — Patent Law Works LLP

(57) ABSTRACT

An access control system, data storage device, and method to enable an authorized host computing system to access replay protected memory blocks (RPMB) in a data storage device (DSD). This includes an access control system determining the host computing system to be authorized to access the DSD, and securely programming the host computing system and DSD with at least one RPMB key. The DSD is configured to authenticate, using the RPMB key, requests from the host computing device to access the protected memory blocks.

20 Claims, 11 Drawing Sheets

ACCESS CONTROL SYSTEM AND A DATA STORAGE DEVICE

TECHNICAL FIELD

This disclosure relates to an access control system. This includes a method and system for a host device to securely access a data storage device.

BACKGROUND

User data can be protected by restricting physical access to a data storage device. Typically, password-based authentication is used for additional security.

In some situations, a data storage device is shared with multiple users. A data storage device, shared amongst a group of peers, may have some files intended to be accessed by a particular user. A problem with known examples of data storage devices shared with multiple users is that anyone with access to the password could have access to all the protected data. Another problem with known examples is that they are vulnerable to replay attacks.

A replay (or playback) attack is a form of network attack wherein data is copied from a legitimate interaction between two entities which is detected and then rebroadcast by a third party posing as one of the original entities. Data from the legitimate interaction contains the correct sender and recipient information. Therefore the third party will be able to spoof authentication details.

In some applications, data storage devices are removable. A multimedia card (MMC) is a flash memory card used for solid state storage. Secure Digital (SD) cards have largely replaced multimedia cards and since 2018 very few companies have manufactured devices with multimedia card slots. However, the embedded multimedia card (eMMC), continues to be widely used in consumer electronics. In general, the configuration and application of embedded multimedia cards are designed to be irremovably located within a host computing system such as a personal computer or smart phone. Conventionally, the eMMC communicates data signals, control signals, commands, clock(s), and/or power signals with the connected host in accordance with a line bus.

SUMMARY

Disclosed herein is a method executed by at least one processor of an access control system comprising: receiving a request to enable access of a host computing system to a Replay Protected Memory Block (RPMB) of a data storage device (DSD); processing the request to determine whether the host computing system is authorized to access the RPMB of the DSD; and in response to determining that the host computing system is authorized to access the RPMB of the DSD, securely programming the host computing system and the DSD with a RPMB key, wherein the DSD is configured to authenticate, using the RPMB key, the host computing system to access the RPMB via a data path of the DSD.

In some embodiments, determining whether the host computing system is authorized to access the RPMB of the DSD includes validating (i) an identity of the host computing system and (ii) an identity of the DSD.

In some embodiments, securely programming the host computing system and the DSD with the RPMB key includes: (i) determining a value of the RPMB key; and (ii) utilizing at least one secure communications channel to transmit the determined value of the RPMB key to the host computing system and to the DSD.

In some embodiments, the RPMB key has a predetermined value associated with the identity of the DSD, such that determining the value of the RPMB key includes retrieving a stored copy of the predetermined value.

In some embodiments, programming the DSD with the RPMB key occurs only once for the predetermined value of the key.

In some embodiments, determining a value of the RPMB key includes generating a new host-specific RPMB key value that is unique to the combination of the identity of the host computing system and the RPMB of the DSD.

In some embodiments, the new host-specific RPMB key value is generated by processing the value of one or more keys of an access key set of the DSD, wherein the DSD is configured to authenticate, using respective keys of the access key set, the access of one or more corresponding host computing systems to the RPMB via a data path of the DSD.

In some embodiments, the determined value of the RPMB key is transmitted to the host computing system via a first secure communications channel, wherein the first secure communications channel is established between the access control system and the host computing system via a cryptographically secure message exchange.

In some embodiments, the determined value of the RPMB key is transmitted to the DSD by the host computing system via the data path of the DSD and in response to the host computing system receiving the RPMB key from the first secure communications channel.

In some embodiments, the determined value of the RPMB key is transmitted to the DSD via a second secure communications channel, wherein the second secure communications channel is established via a cryptographically secure message exchange between the access control system and the DSD.

In some embodiments, the second secure communications channel is established in response to determining that the host is authorized to access the RPMB of the DSD.

In some embodiments, in response to a failure to determine that the host is authorized to access the RPMB of the DSD, discarding the request received from the host computing system and generating notification data to notify an external system of the request.

Disclosed herein is a removable data storage device (DSD) comprising: a non-volatile storage medium configured to store user data, wherein the storage medium includes a Replay Protected Memory Block (RPMB) formed in a plurality of non-volatile memory cells with an access key set; a data port configured to transmit at least data between a host computing system and the DSD via a data path; and a controller configured to: in response to the access key set including a RPMB key, authenticate one or more operations of the host computing system to access the RPMB; and adjust the access key set in response to one or more key control operations performed on the DSD by an access control system, wherein the one or more key control operations include: a secure key programming operation to cause the controller to add the RPMB key to the access key set.

In some embodiments, the secure key programming operation is performed by the access control system in response to: (i) receiving, by the access control system, a request to enable access to the RPMB of the DSD; and (ii) determining, by the access control system by processing the request, that the host computing system is authorized to access the RPMB of the DSD.

In some embodiments, the host computing system is determined as authorized to access the RPMB of the DSD in response to a validation of: (i) an identity of the host computing system and (ii) a device identifier key of the DSD.

In some embodiments, the RPMB key has a predetermined value.

In some embodiments, the RPMB key is a host-specific key having a value that is generated, by the access control system, by processing the value of one or more keys of the access key set.

In some embodiments, the controller is configured to receive the RPMB key via a secure communications channel, wherein the secure communications channel is established via a cryptographically secure message exchange between the access control system and at least one of the host computing system and the DSD.

In some embodiments, the one or more key control operations includes: a secure key removal operation to cause the controller to remove the RPMB key from the access key set in response to: (i) receiving, by the access control system, a request to disable access of the host computing system to the RPMB of the DSD; and (ii) validating, by the access control system, the request to disable access of the host computing system to the RPMB of the DSD.

Disclosed herein is a removable data storage device (DSD) comprising: a means for storing user data including means for storing a Replay Protected Memory Block (RPMB); a means for storing a corresponding RPMB key; a means for storing at least one second counter value; means for receiving an instruction and a first access code from a host computing system, wherein the first access code is derived from a RPMB key stored at the host computing system and at least one first counter value; means for generating a second access code from the corresponding RPMB key and the at least one second counter value; means for comparing the first access code to the second access code; responsive to the first access code matching the second access code, means for executing the instruction from the host computing system; and means for incrementing the at least one second counter value in the means for storing the at least one second counter value.

BRIEF DESCRIPTION OF DRAWINGS

Some embodiments are described herein below with reference to the accompanying drawings, wherein:

FIG. 6 illustrates a method of adding a host computing system to the system.

FIG. 8 illustrates an alternative method of adding a host computing system to the system.

FIG. 9 illustrates a method of removing a host computing system from the system via a first host computing system.

DETAILED DESCRIPTION

Overview of System Components

Figure 1:
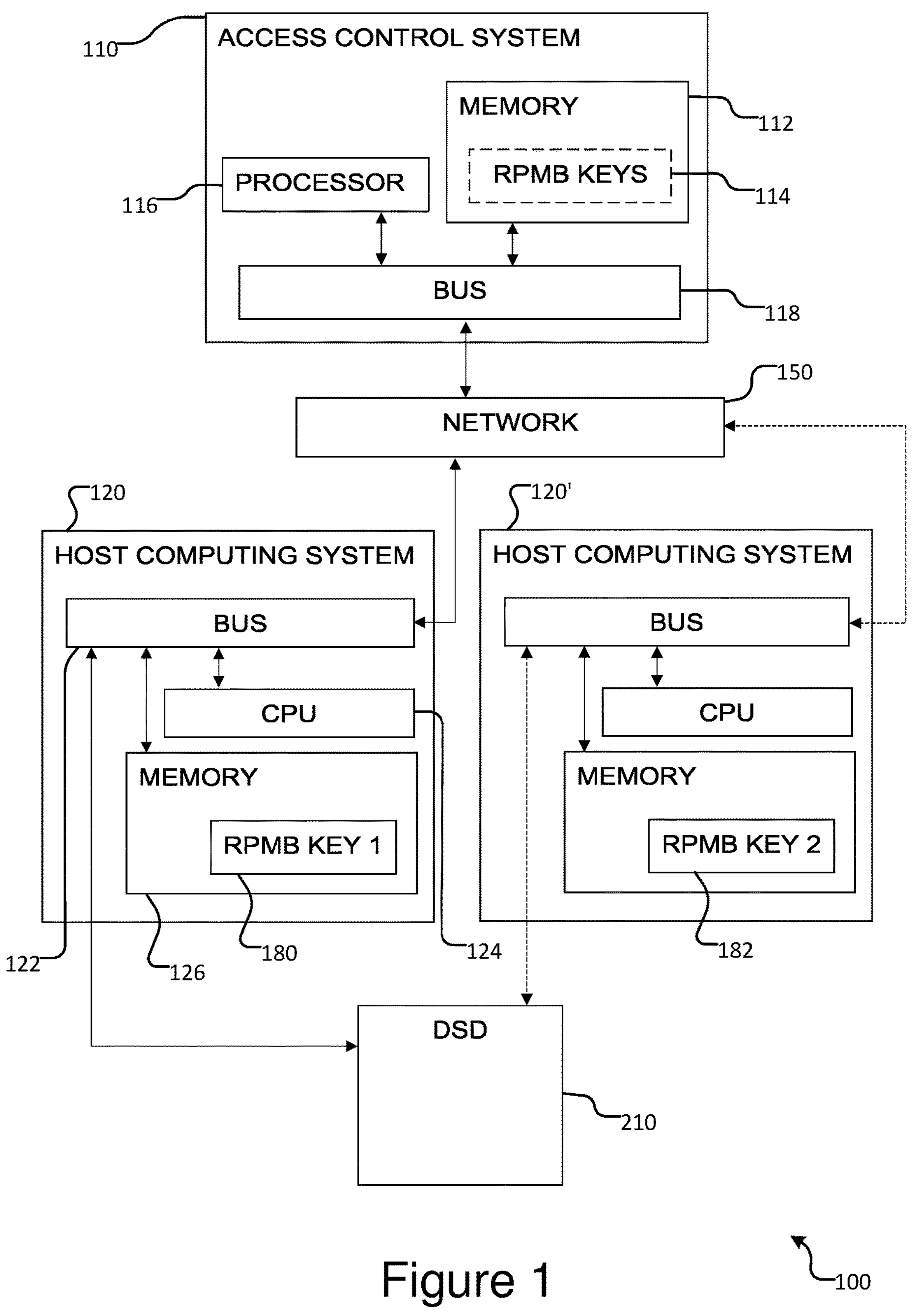
FIG. 1 illustrates a schema of system components.

FIG. 1 illustrates an overall system to enable secure operations between at least one host computing system 120 and a data storage device (DSD) 210. The secure operations include the host computing system 120 accessing replay protected memory blocks (RPMB) of the DSD 210 based on authenticated operation requests with a shared RPMB key 180.

The system 100 includes an access control system 110 that is configured to determine whether a specific host computing system 120 is authorized to be used with a specific data storage device 210. In response to determining that a specific host computing system 120 is authorized, the access control system 110 is configured to securely program into the secured host computing system 120 in a secured environment and corresponding DSD 210 with a shared RPMB key 180. In some examples, this may be performed as an initialization step within a secure environment to transfer the RPMB key to the host computing system 120 and the DSD 210. In some examples, the secure environment may include communication via a network 150 that may include a local area network (LAN), wide area network (WAN), a wireless local area network (WLAN), a storage area network (SAN), or a system area network, or a direct wired connection between the access control system 110 and the host computing system 120.

In some examples, after the host computing system 120 and corresponding DSD 210 are initially programmed with the RPMB key 180, subsequent secure operations between the host computing system 120 and the DSD 210 can be conducted based on the shared RPMB key 180. Such operations may be conducted over a data path between a host computing system 120 and the DSD 210 and without additional authentication by the access control system 110.

In further examples, a single DSD 210 can be shared with multiple host computing systems 120, 120'. In some examples, a first host computing system 120 may be programmed with a first RPMB key 180 and the second host computing system 120 may be programed with a second RPMB key 182. The DSD 210 is programmed with both the first and second RPMB key 180, 182 to enable both host computing systems 120, 120' to conduct secure operation with the RPMB of the DSD 210, including accessing the same data and data blocks.

In a practical, but non-limiting, example, a user may have a first host computing system 120 at a work office and a second host computing system 120' at a home office. The system enables the user to communicatively connect the DSD 210 to the host computing system 120 to securely read and write data to the DSD 210 when physically at work. The user can then physically remove the DSD 210 and communicatively connect the DSD 210 to the second host computing system 120' in the home office to securely read and write to the same DSD 210.

Data Storage Device

Figure 2:
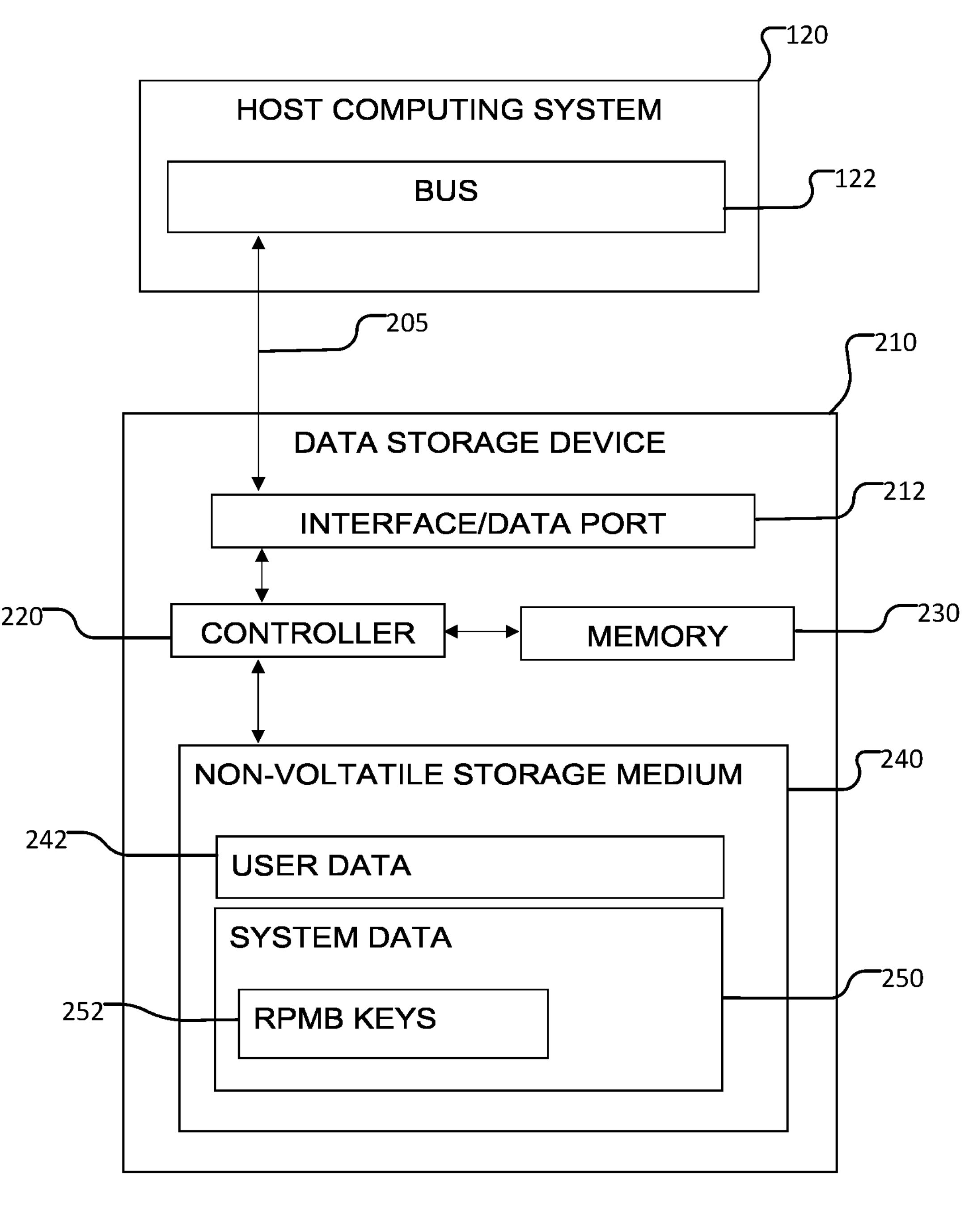
FIG. 2 illustrates a schema of a data storage device connected to a host computing system.

With reference to FIG. 2, in some embodiments the data storage device 210 comprises an interface or data port 212 configured to connect to a bus 122 of the at least one host computing system 120. The data storage device further comprises a controller 220 and memory 230 such that the data storage device 210 is capable of executing machine instructions independently or at least semi-independently of the central processing unit (CPU) 124 (see FIG. 1) of the at least one host computing system 120. The controller 220 is configured to access a non-volatile storage medium 240.

The data path, in this example, comprises a wire-based interface/data port 212 which is provided in FIG. 2 by a universal serial bus (USB) bridge for transmission of data between a host computing system 120 and the DSD 210. In other embodiments, the data path comprises a wireless data port (not shown) for wireless transmission of data between the host computer system 120 and the DSD 210. The DSD 210 registers with the host computer system 120 as a mass data storage device providing the functionality to the operating system of the host computer system 120 of a block data storage device.

A non-volatile storage medium 240 is non-transitory such as to retain the stored block data irrespective of access to a power source from a host computing system 120. The medium 240 may be a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD (solid state hybrid drive). Any other type of non-volatile storage media may also be used, including emerging non-volatile memory such as Program in Place or Storage Class Memory (SCM), such as resistive random access memory (ReRAM), phase change memory (PCM), and magneto-resistive random access memory (MRAM). Further, the storage medium 240 may be a block data storage device, such that the user data 242 is written in blocks to the storage medium 240 and read in blocks from the storage medium 240.

In some embodiments the data storage device 210 utilizes static memory allocation such that memory partitions exist at specific memory addresses. In said embodiments the amount of space dedicated to the RPMB partition is constant thereby imposing an upper limit on the number of RPMB keys stored on the data storage device 210. For example, the non-volatile storage medium may store the boot partition between memory address 0 and 0x800, and the RPMB partition between 0x800 and 0x900. In alternative embodiments, the data storage device dedicates a specific block of memory to the boot partition 308 and stores a plurality of RPMB keys beginning at a certain location. This avoids dedicating a fixed amount of memory to RPMB keys, which may be insufficient (more keys are required than there is dedicated space for them) or over generous (fewer keys are required than space has been dedicated for thereby leaving unused memory space). User data is initially written to some other (i.e., non-contiguous with the RPMB partition) region of memory. It will be apparent to one of ordinary skill in the art the myriad ways in which memory management is implementable.

Figure 3:
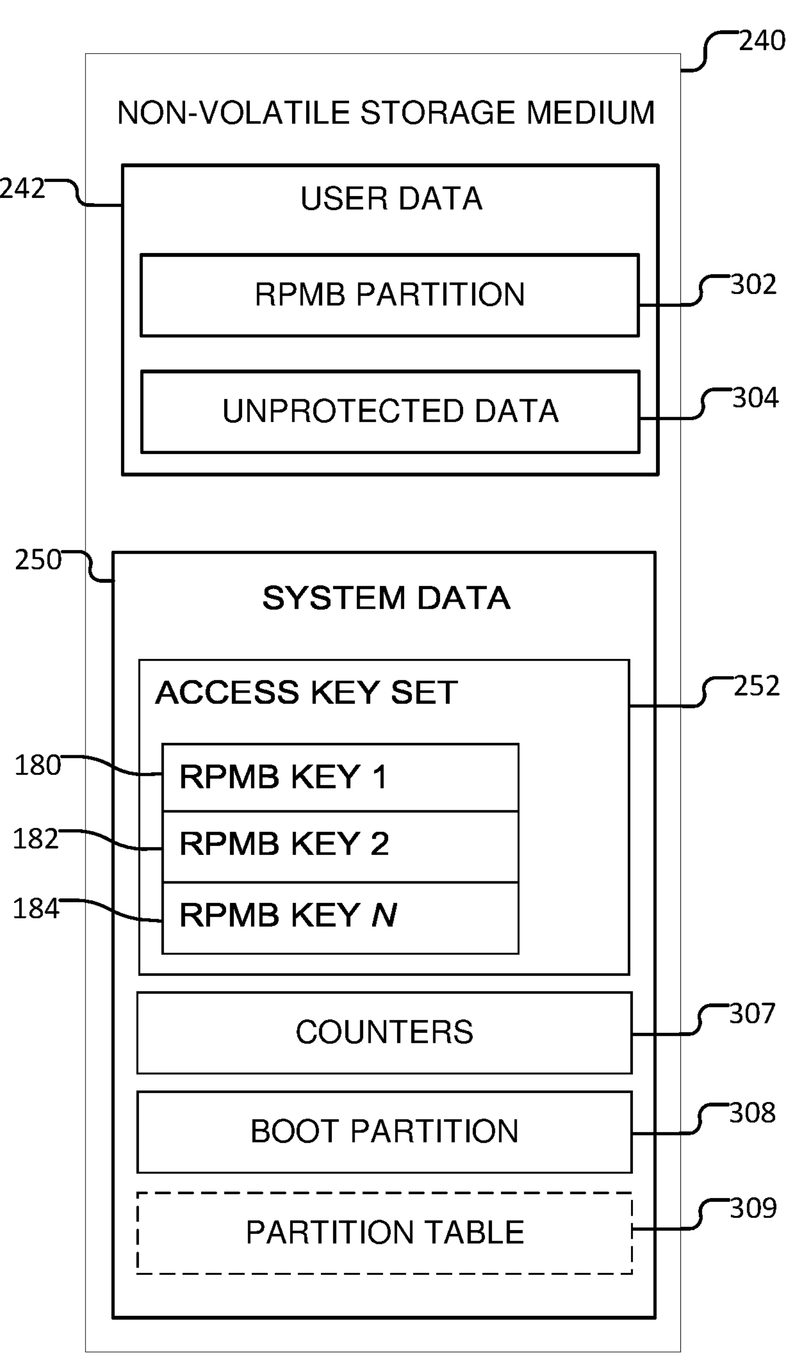
FIG. 3 illustrates memory partitions within a non-volatile storage medium of a data storage device.

The contents of the non-volatile storage medium 240 are illustrated in FIG. 3. The non-volatile storage medium 240 of the data storage device 210 comprises user data 242 and system data 250. In some embodiments the memory management of user data 242 and system data 250 corresponds to virtual rather than physical memory.

With reference to FIG. 3, in some embodiments the DSD 210 comprises more than one non-volatile storage medium 240 such that a RPMB partition 302 is located in a different storage medium to the unprotected data 304.

User Data

The data storage device 210 provides a region 242 of non-volatile memory 240 for end users to read and write to. The user data 242 stores user content data, noting that the user content data is the data that a user would typically want to store on a data storage device, such as files including image files, documents, video files, etc.

In some embodiments the user data 242 of the non-volatile storage medium 240 is divided into secure data stored in a RPMB partition 302 and unprotected data 304. Access to the RPMB partition 302 is restricted to authenticated host computing systems 120, 120'. In some embodiments the RPMB partition 302 is encrypted to further improve security. This may be achieved with: A) software encryption such as BitLocker, DiskCryptor, VeraCrypt, advanced encryption standard (AES) 256, secure hash algorithm (SHA)-based encryption, hash-based message authentication code (HMAC) SHA-256 or similar substitute; and/or B) hardware encryption techniques, as would be apparent to one skilled in the art. The unprotected 304 region of user data 242 is accessible to any host computing system coupled to the data storage device 210. In alternative embodiments the unprotected data 304 is read-only to unauthenticated host computing systems 120. In alternative embodiments unauthenticated host computing systems 210 have read-write permissions to unprotected data 304. In some embodiments, the user data 242 comprises only a RPMB partition 302.

System Data

The data storage device 210 provides a region 242 of non-volatile memory 240 for system data 250. The system data provides machine instructions to be executed on the controller 220. In some embodiments the system data 250 stores a boot partition 308 storing software responsible for booting the DSD operating system. In some embodiments the system data 250 stores counters 307 corresponding to each of the RPMB keys in the RPMB key partition.

The boot partition 308 stores machine instructions configured to be executed by controller 220 using memory 230. This enables authentication logic to be performed independently, or semi-independently, of the host computing device.

In some embodiments the system data 250 stores a partition table 309 that describes the partitions of the non-volatile memory 240. For example, the partition table describes the location in memory of user data 242, the boot partition 308, a RPMB key partition, et cetera.

RPMB Key Partition

In some embodiments the non-volatile storage medium 240 comprises an access key set 252 located within the system data 250 region of memory. The access key set 252 either stores or is reserved to store at least one RPMB key 180. In some embodiments, the access key set 252 stores a plurality of RPMB keys 180, 182, 184. In some examples, the system data 250 further comprises a list of counters at 307 (corresponding to each of the RPMB keys).

Function Summary

Figure 4:
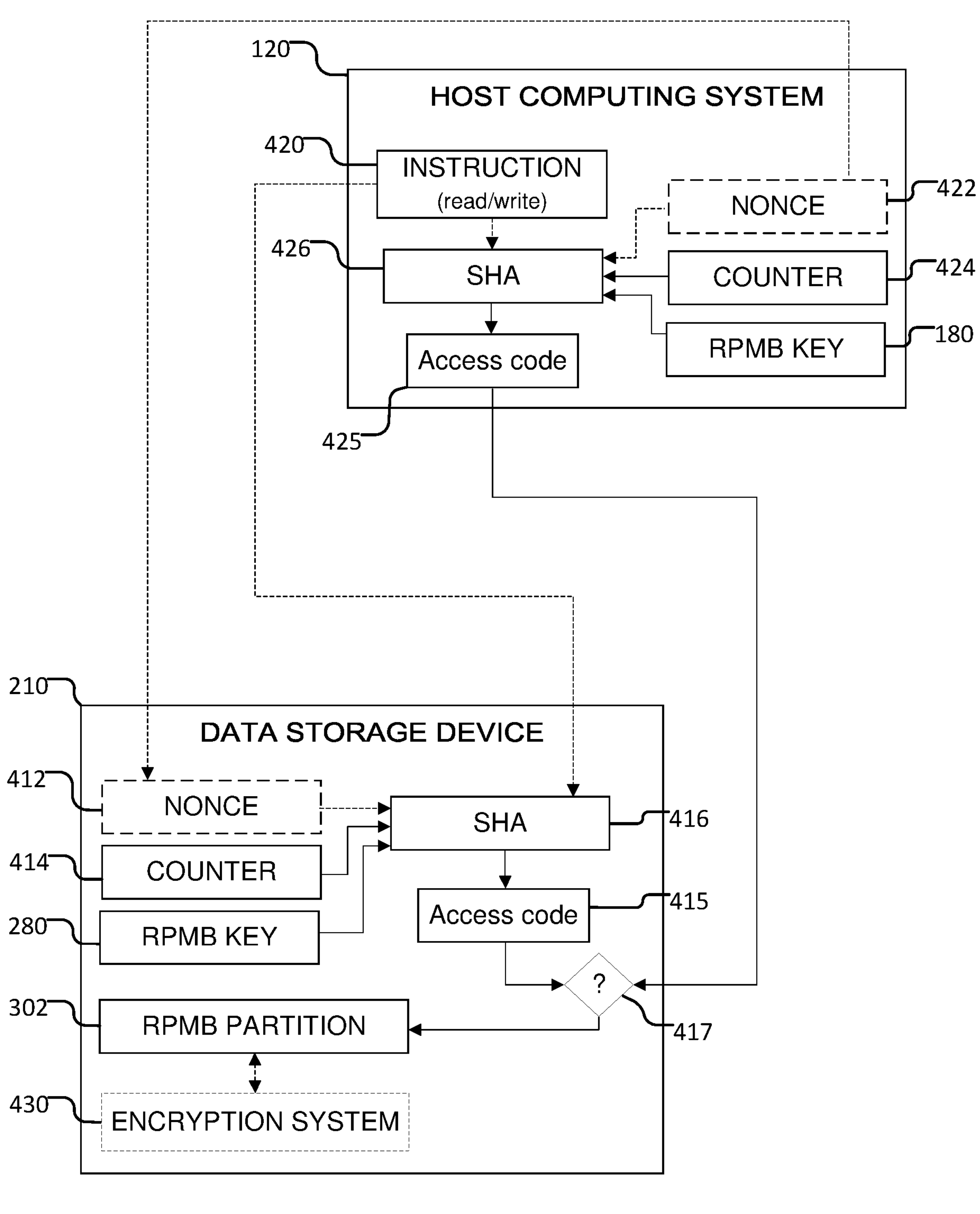
FIG. 4 illustrates a process of a host computing system accessing protected memory of a data storage device.

FIG. 4 illustrates a process for utilizing the aforementioned components. In some embodiments a RPMB key 180 from the access key set 252 are used to validate instructions 420 from a host computing system 120. The RPMB key 180 of a host computing system 120 is hashed 426 with (or otherwise used to generate) a first access code 425. In some embodiments the access code 425 is the further result of at least one of: a counter 424, a cryptographic nonce value 422, and/or the instruction 420. In some embodiments the hash 426 is the Secure Hashing Algorithm (SHA-256). The data storage device 210 receives the access code 425 from the host computing system it is coupled with and, using its system data 250, generates its own access code 415. The RPMB key 280 at the data storage device 210 and its corresponding counter 414 are hashed using an equivalent hash function 416 to produce a second access code 415. In some embodiments, the second access code 416 is the further result of at least one of: nonce value 412 (which may be sent to the data storage device 210 from the host device 120) and/or the instruction 420. The first and second access codes 425, 415 are then compared at 417 using controller 220 and memory 230. This is discussed in further detail in the section titled System function below.

Host Computing System

The host computing system 120 comprises one or more processing components 124. In one embodiment, the host computing system 120 comprises a personal computer, such as a desktop computer or a laptop computer. The host computing system 120 comprises a device driver which is configured to communicate with the DSD 210 over data interface 205. Accordingly, the DSD 210 is configured to receive and transmit data to the host computer system 120, over data interface 205, via data port 212.

Cryptographic Nonce

Figure 11:
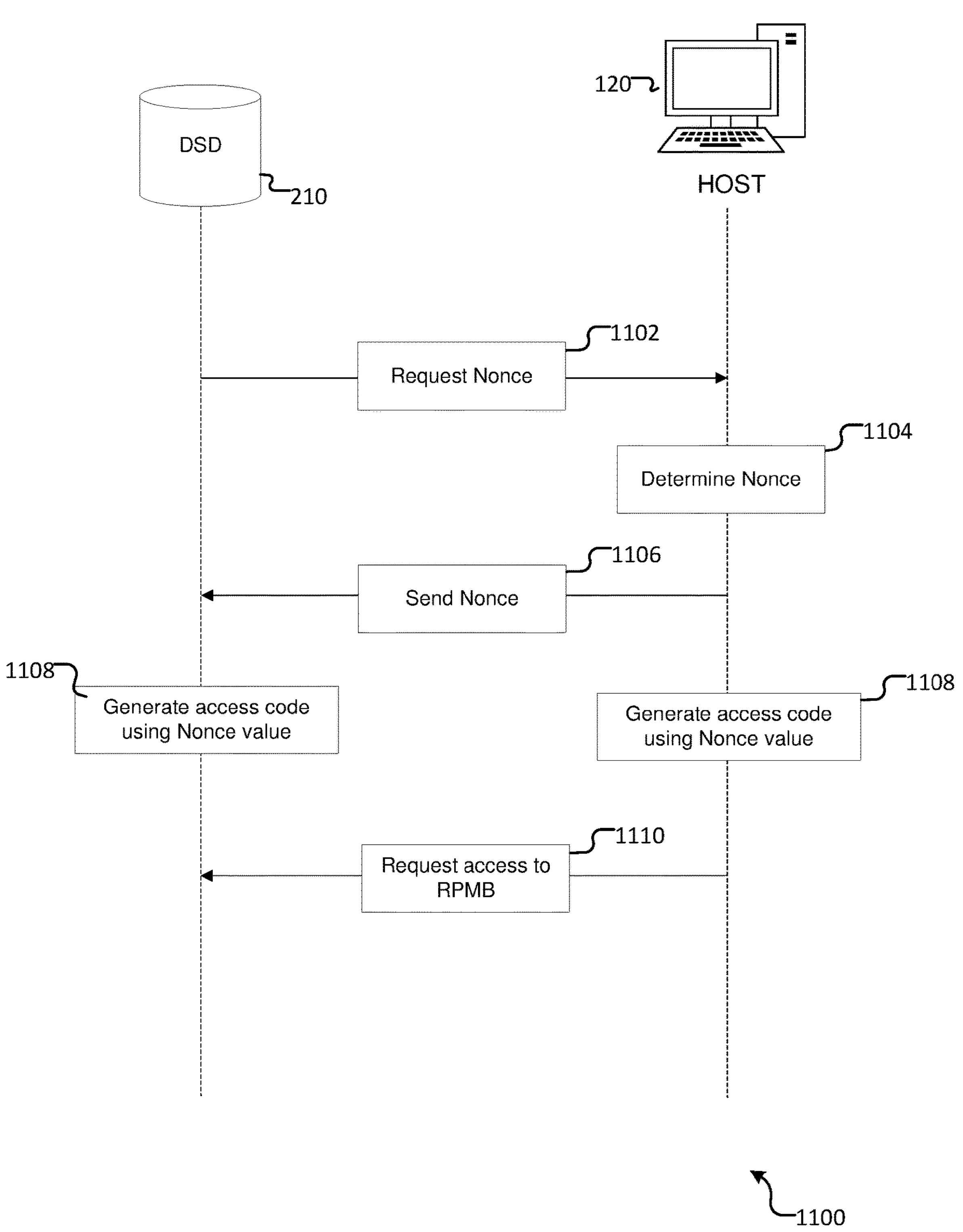
FIG. 11 illustrates a method of a cryptographic nonce being used in a host computing system requesting access to a data storage device.

FIG. 11 illustrates a method 1100 of a cryptographic nonce being used in a host computing system requesting access to a data storage device. In some embodiments the host computing system 120 is configured to determine cryptographic nonce values. In response to a request, at block 1102, from a data storage device 210, a host computing system 120 will send, at block 1106, back a generated cryptographic nonce. In some embodiments, the cryptographic nonce is generated at block 1104 upon receiving a request at block 1102. In alternative embodiments the cryptographic nonce is generated at block 1104 before receiving a request at block 1102 such that the host computing system 120 has a prepared cryptographic nonce value. This may be advantageous in that the generation does not need to be performed in real-time thereby reducing runtime activity. In some embodiments, the cryptographic nonce may be used as a substitute for a counter 414, 424 this is to minimize the resource requirements of the host computing system 120.

Responsive to the data storage device 210 receiving the cryptographic nonce value 422 from the host computing system 120, the nonce 422 is used to generate at block 1108 the access code 425. The access code 425 is then sent at block 1110 to the data storage device 210 with or as a request to access the RPMB partition 302.

The cryptographic nonce is an arbitrary number or value for one-time use. As each access code 425 relies on a one-off value, repeating an access code will fail at the comparison step 417 due to the cryptographic nonce being expired on its second use. As in FIG. 4, the access code generated from the expired cryptographic nonce will be compared at 417 to a new access code generated from a second cryptographic nonce 412.

RPMB Request

In some embodiments the commands sent from a host computing system 120 to a data storage device 210 are structured to allocate space for: padding, a message access code 425, a nonce value 422, a counter value 424, a memory address of the RPMB, a number corresponding to sector count, a result of the operation, an indication of the type of command (request, response, authentication response, etc.), and data. In some embodiments the RPMB is partitioned into sectors of 512 bytes. For a host computing system to access a region of memory, the command specifies a starting memory address and the number of sectors. In alternative embodiments the command may specify a starting memory address and a terminating memory address. The padding in the command enables the command to be a fixed length such that for all commands sent between data storage device 210 and host computing system 120, the message access code terminates at position 0x222.

In some embodiments the list of possible operation results comprises: success, general failure, authentication failure, counter failure, address failure, write failure, and read failure.

In some embodiments the section of the command storing the nonce value is read by the data storage device and used to generate the access code 416. This eliminates the need for the DSD 210 to make a separate request from the host computing system 120 for the nonce value. In these embodiments the DSD 210 stores a record of at least one past nonce value such that it can detect and reject repeated commands. In some embodiments both the counter value and the nonce value are encrypted and the DSD 210 is provided with a means of decryption. In alternative embodiments the access code will be generated from the counter value, RPMB key, and nonce value such that the command does not need to separately contain the counter value and nonce value. This reduces the bandwidth required to transmit the command.

Access Control System (ACS)

Referring to FIG. 1, the access control system 110 comprises one or more processing components 116 and memory 112. In one embodiment the access control system 110 comprises a server. The access control system 110 is connected to a network 150 and is configured to receive and transmit data from a host computing system 120 and a data storage device 210.

In some embodiments the access control system is configured to generate a RPMB key 114 to enable a host computing system 120 to access a data storage device 210. Methods of generating RPMB keys are disclosed below.

In some embodiments the ACS memory 112 will store at least one RPMB key 114 that is, or will be, associated with a host computing system 120 and data storage device 210. This provides an administrator or end user with the opportunity to identify the RPMB key of a host computing system 120 that has become compromised to remove or deactivate the compromised host 120 from the system 100.

In alternative embodiments the ACS memory 112 will not store a copy of the at least one RPMB key 114. There are at least two reasons this feature is desirable. Firstly, it eliminates vulnerability of the data storage device 210 to attacks on the access control system 110 such that the integrity of the RPMB 302 is not compromised even if the access control system 110 is. Secondly, the data storage device 210 becomes its own source of truth thereby enabling the system 100 to function independently of any one specific access control system 110. Once an RPMB key 114 is generated, the access control system 110 sends the RPMB key 114 to the host computing system 120 without saving its value. In these embodiments the data storage device 210 acts as a single source of truth. Other than to add new host computing systems 120, the system 100 would not rely on the access control system 110 for routine authentication and data access to the RPMB 302. This is desirous if the system is relatively static as it reduces external dependency.

Key Generation Methods

Figure 6:
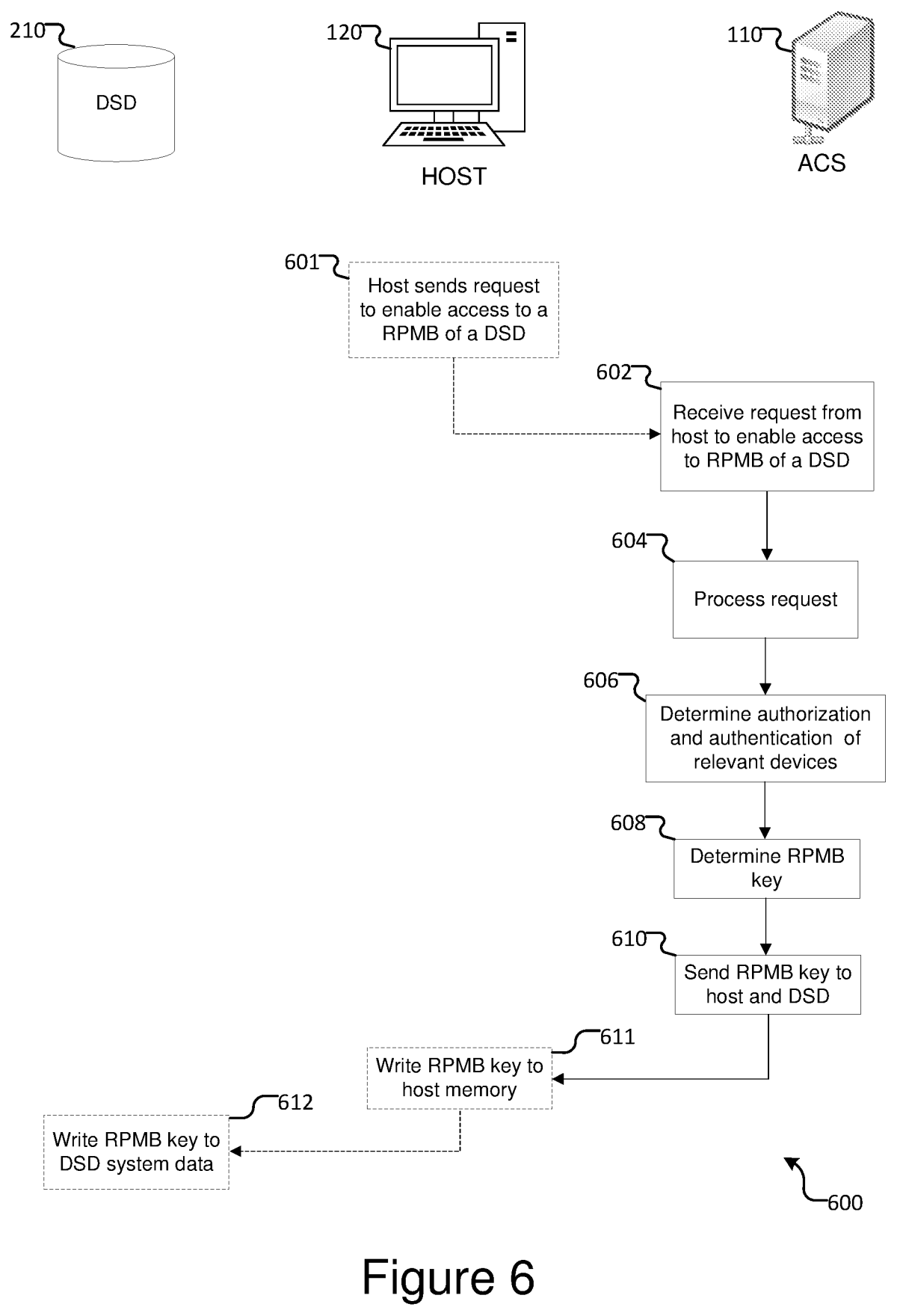
Figure 8:
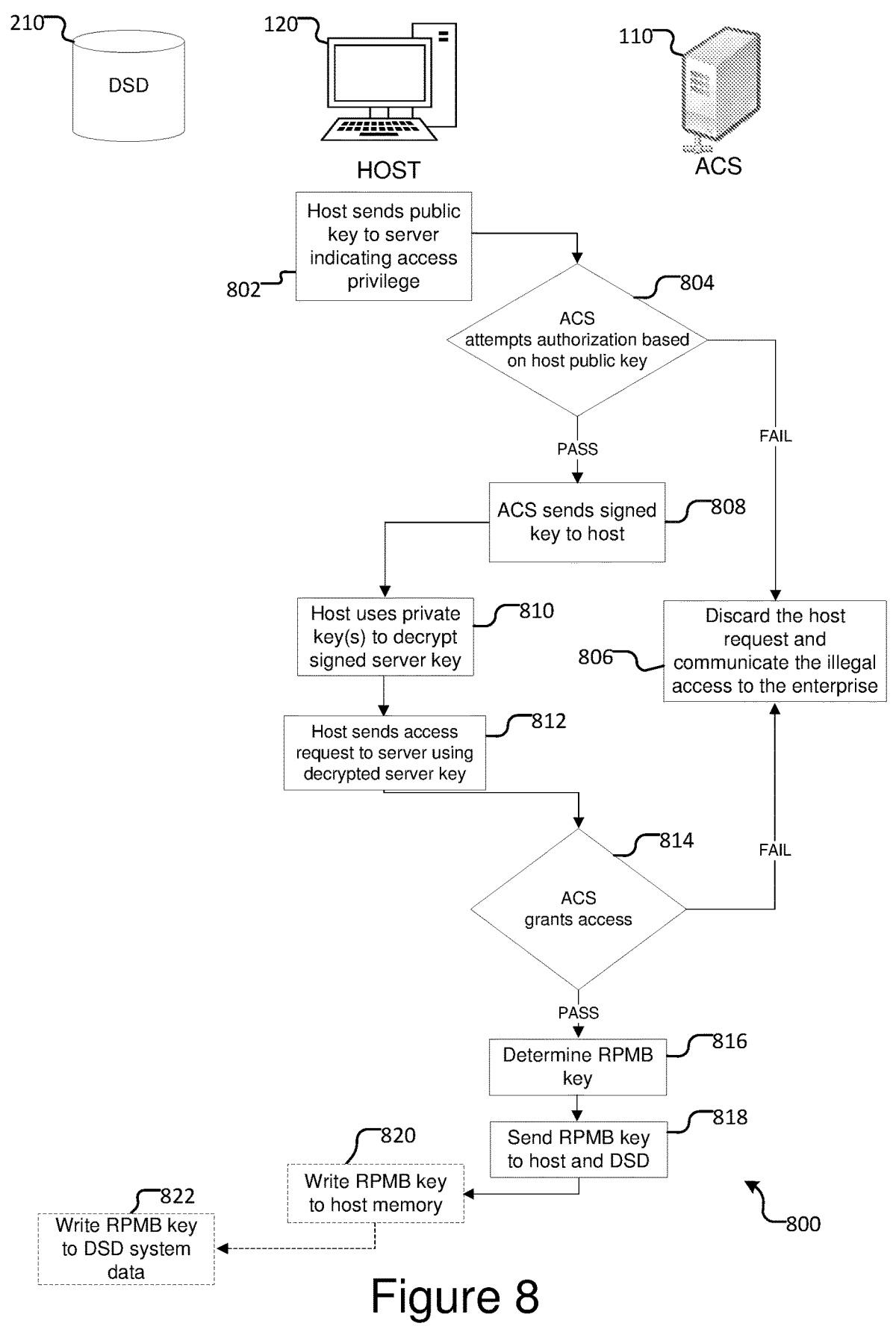

FIGS. 6 and 8 illustrate a method step wherein a RPMB key is determined 608, 816. In some embodiments the system 100 comprises a plurality of RPMB keys 180, 182, 184. Accordingly each RPMB key is generated. In some embodiments the RPMB keys will be generated independently of one another such that any existing RPMB keys have no influence on the generation of new RPMB keys. In some embodiments this includes generating keys based on the Media Access Control (MAC) ID/MAC address of the relevant host computing system. In alternative embodiments this includes random key generation. In some embodiments the RPMB keys will be generated such that each key is dependent on at least one other key. In some embodiments the RPMB keys are generated sequentially (i.e. each key is generated from/linked to one or more preceding keys). In alternative embodiments RPMB keys are based on the existing key count.

In some embodiments the value of a generated RPMB key is host-specific and the key value is unique to the combination of the identity of the host computing system 120 and the RPMB 302 of the DSD 210.

Single-Key

In some embodiments instead of providing each host with a unique key, one key is shared between all authorized host computing systems 120, 120'. In the trade-off between security and accessibility, a single key mitigates many of the accessibility issues arising from a system 100 utilizing a plurality of keys. One notable advantage of using a single key is the minimization of the space required for system data 250 as the RPMB key partition size is constant. This makes the system more easily scalable.

Time Sensitive Keys

Any RPMB keys provided to an authenticated host computing system 120 may have an expiration time. After this time has elapsed, the host 120 will need to renew its credentials with the server. This time sensitivity ensures that if the data storage device 210 is lost or a RPMB key is somehow jeopardized, there is a time constraint on the opportunity for an unauthorized user to access the RPMB 302. In these embodiments, each of the RPMB keys stored in 252 has a corresponding date and time expiration value. Responsive to a data storage device comparing 417 an access code 420 from a host 120 to its own determined access code 415 there is a further step to compare the current date and time to the expiration time. If the current time is less than the expiration time, the instruction is validated.

User Hierarchy and Host Privileges

Some host computing systems 120 may have more rights than others. For example, administrators may be able to kick other hosts from the system. In one embodiment some hosts may have read-only permission on the RPMB. This is desirous if the security and integrity of the RPMB data 302 are important as some users may need to read the data but are not trusted to perform edits.

Multifactor Authentication

In some embodiments authentication of a host may comprise additional steps to RPMB key validation. In addition to the RPMB key, the DSD may also require the user to provide additional information that was programmed into the DSD during initial authentication. For example, the DSD may have been provided with a PIN that an end user is required to input as an initial step before enabling access to the RPMB.

System Function

Embedded multimedia cards have acquired several security features through their development history and many now contain replay protected memory blocks. The replay protected memory blocks are tightly coupled to the media access control address (MAC address) of the associated device. This greatly enhances the memory security. However, the tight coupling of memory to one specific device (in addition to being physically embedded in a device) poses a major accessibility constraint. Accessibility to the protected memory is limited essentially exclusively to the device with the embedded card. This has traditionally been seen as an advantageous constraint.

The security provided by embedded multimedia cards is hereto utilized by a removable storage device. By programming RPMB keys into host computing systems 120 with whitelisted MAC addresses, the accessibility constraint of embedded cards is at least partially overcome. An unauthorized or malicious actor seeking access to the protected memory will need:

a). Physical access to the data storage device, and b). A valid identification key.

Figure 5:
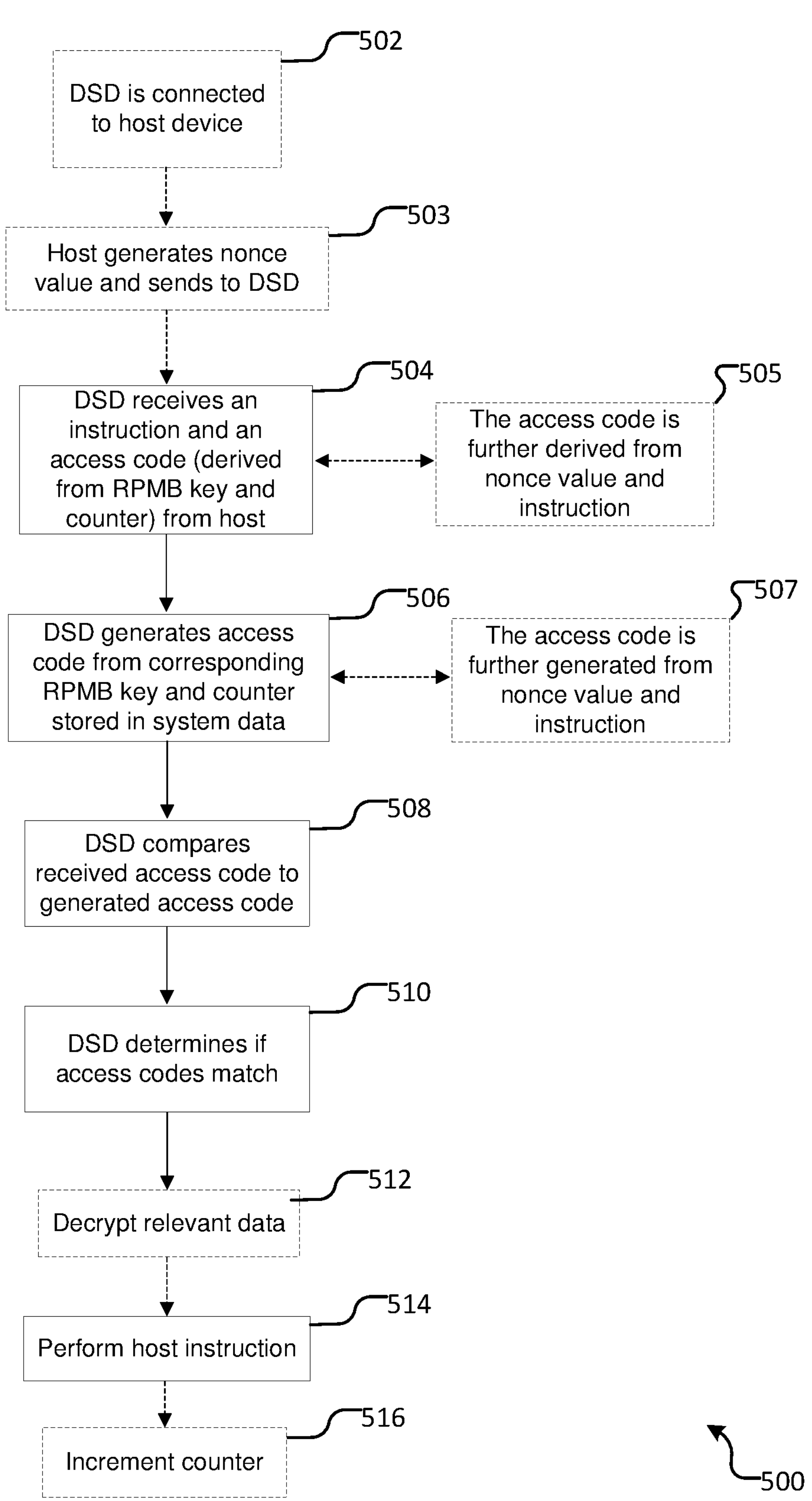
FIG. 5 illustrates a method of a data storage device enabling a host computing system to access a RPMB.

Referring to FIGS. 4 and 5, in one embodiment there is provided a method 500 of executing a machine instruction 420 (from a host computing system 120) on a secure flash memory drive 210. The machine instruction 420 requiring access to RPMB 302. The host computing system 120 and the secure flash memory drive 210 each have stored a RPMB key 180, 280 and counter 424, 414 (the different reference numerals indicate different devices and not necessarily different values). The host computing system further stores a machine instruction 420 to be executed on the secure flash memory drive 210. The method may include:

Block 502: In some embodiments, the method comprises the step of connecting the secure flash memory drive 210 to the host computing system 120 via data port 212. In some embodiments, the data port 212 is a USB interface. This creates a data exchange channel 205 between host computing system 120 and flash memory drive 210.

Block 503: In some embodiments, the host computing system 120 generates a cryptographic nonce value 422 and sends it to secure flash memory drive 210 (the DSD).

Block 504: The secure flash memory drive 210 receives a machine instruction 420 and access code 425 from the host computing system. The RPMB key 180 and counter value 424 of the host computing device 120 are hashed at 426 to generate an access code 425. In some embodiments the hash 426 further takes the machine instruction 420 as an input. In some embodiments the hash 426 further takes cryptographic nonce value 422 as an input. The machine instruction 420 and access code 425 are transmitted through the data port 212 (via channel 205) to the secure flash memory drive 210.

Block 505: In some embodiments, access code 425 is further derived from nonce value 422 and the machine instruction 420.

Block 506: The RPMB key 280 and counter value 414 of the secure flash memory drive 210 are hashed (using controller 220) at 416 to generate an expected access code 415. In some embodiments the hash 416 further takes the machine instruction 420 as an input. In some embodiments the hash 416 further takes cryptographic nonce value 422 as an input.

Block 507: In some embodiments, expected access code 415 is further generated from cryptographic nonce value 422 and machine instruction 420.

Block 508: The secure flash memory drive 210 compares at 417 the received access code 425 to the expected access code 415.

Block 510: The secure flash memory drive 210 determines if the received access code 425 matches the generated or expected access code 415. If the secure flash memory drive 210 determines the received access code 415 matches the expected access code 425 at 510, the machine instruction 420 is executed. If the received access code 425 differs from the expected access code 415, the host computing device 120 will not be able to retrieve or edit data stored in the RPMB partition 302.

Block 512: In some embodiments the RPMB 302 stored on the secure flash memory drive 210 is encrypted. In these embodiments any read operations to the RPMB 302 must involve the step of decrypting the data using encryption system 430.

Block 514: The secure flash memory drive 210, having authorized the instruction 420 from the host computing device 120, executes said instruction. If the instruction involves writing data to RPMB 302, some embodiments the write data is encrypted using encryption system 430.

Block 516: In some embodiments the method 500 further comprises the step of the secure flash memory drive incrementing its counter 414. The counter is incremented with each access request made by the host computing system 120. This is to help prevent vulnerability to replay attacks. Any unauthorized host that manages to intercept access code 425 is unable to access the RPMB 302 by simply repeating a previous request. This is because the counter 414 is incremented such that a subsequent hash results in a new access code. A repeated request would therefore fail at 510.

Method of Adding a Host to the System

In one embodiment a method is provided for adding a new host computing system 120 to the system 100 within a secure environment. Referring to FIG. 6, in some embodiments, the method 600 includes a first block 601 in which a host computing system 120 sends a request to access a RPMB 302 of a data storage device 210 to an access control system 110. At block 602, an access control system (ACS) 110 receives a request from the host computing system 120 to enable access to a RPMB of a data storage device 210. The access control system 110 processes, at block 604, said request and determines, at block 606, the authorization status and authentication of the host computing system 120 or other relevant device. If the host computing system is authorized, the access control system 110 determines a RPMB key at block 608. In some embodiments, the RPMB key is generated according to the key generation methods disclosed above. In alternative embodiments the RPMB key is retrieved from memory 112. The method further includes the access control system 110 sending, at block 610, the determined RPMB key to the host computing system 120 and data storage device 210. The access control system 110 securely programs the host computing system 120 and DSD 210 with the RPMB key. In some embodiments, the method further includes the RPMB key sent by the access control system being saved or written to the host memory of the host computing system 120 at block 611 and the data storage device 210 system data at block 612.

In the event authentication fails at block 606, the request to enable access to a RPMB of a data storage device 210 is rejected.

In some embodiments an administrator provides the access control system 110 with a list of whitelisted host computing systems 120. This enables the access control system 110 to expect requests from specified host computing systems and is therefore able to determine authentication status. In some examples, the access control system 110 is configured to determine authorization by validating: (i) an identity of the host computing system 120 and (ii) an identity of the data storage device 210 (ii). In some embodiments the administrator provides the access control system 110 with the media access control (MAC) addresses of the whitelisted host computing systems 120.

Figure 7:
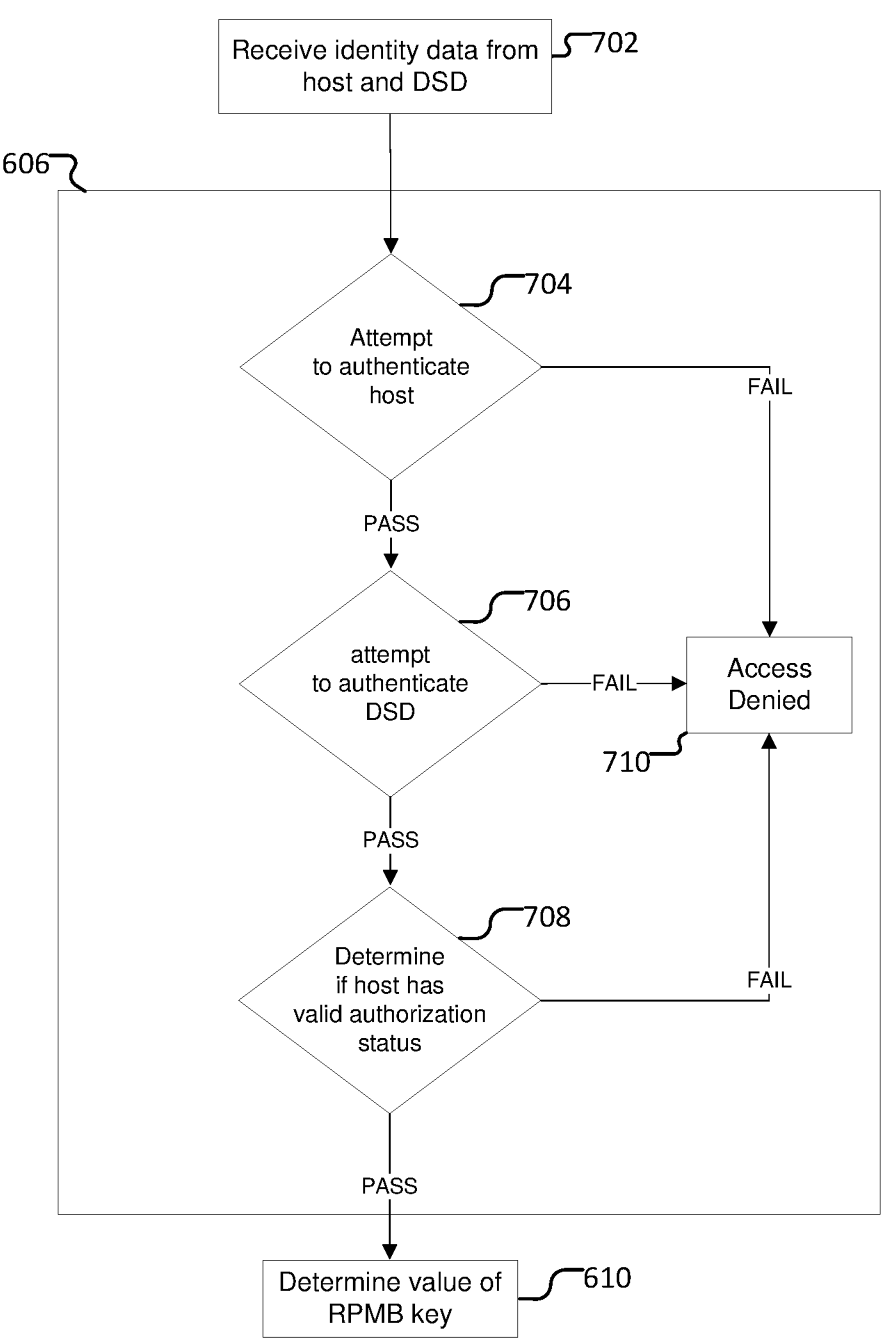
FIG. 7 illustrates further steps of authentication and authorization of devices in the method of FIG. 6.

Referring to FIG. 7, in some embodiments the method 600 further includes:

Block 702: The access control system (ACS) 110 receives identity data of the host computing system 120 and data storage device 210. In some embodiments the access control system 110 receives data indicating the devices 120, 210 store private keys. In other words, identity is verified indirectly such that potentially sensitive information is not propagated around the system 100. In alternative embodiments, the access control system 110 receives the MAC address of the host computing system 120.

Block 704: The access control system 110 attempts to authenticate the identity data received from the host computing device. If authentication fails, server access is denied at block 710. In one embodiment authentication may fail because the received MAC address of the host computing system 120 is not whitelisted.

Block 706: The access control system 110 attempts to authenticate the identity data received from the data storage device. If authentication fails, server access is denied at block 710. In one embodiment authentication may fail because the received MAC address of the DSD 210 is not whitelisted.

Block 708: The access control system 110 determines the authorization status of the host computing system 120.

Alternative Method of Adding a Host to the System

Referring to FIG. 8, an alternative method 800 is provided for adding a host computing system 120 to the system 100 within a secure environment. The method requires a data storage device 210, a host computing device 120, and access control system (ACS) 110. The hosting computing system 120 is provided with a public key and a private key. The access control system 110 is provided with a private server key. The method includes:

Block 802: A host computing system 120 sends a shared public key to the access control system 110.

Block 804: The access control system 110 receives and processes the host public key and determines the authorization status of the host computing system 120.

Block 806: Any host computing system 120 that fails to provide an authorized identity will have its request discarded. The access control system 110 raises an alarm or blacklists the host computing system 120 or at least records its IP details. In some embodiments, the rejected request does not trigger any additional action.

Block 808: If the host computing system 120 is authorized, the access control system 110 signing the shared public key with a private server key. The access control system 110 sending the signed key to the host computing system 120.

Block 810: The authorized host computing system 120 receives the signed key and uses its own private key to decrypt the private server key.

Block 812: The authorized host computing system 120 requests access to the access control system 110.

Block 814: The access control system determines whether to grant access to the host computing system 120. In some embodiments access may be denied as the host may not be provided with a valid private key such that it fails to successfully decrypt the private server key at block 812. In this event, the method proceeds to block 806.

Block 816: The access control system 110 determines an RPMB key.

Block 818: The access control system 110 sends the RPMB key to the host computing system 120 and data storage device 210 via a secure communications channel.

In some embodiments the method further includes block 820 for storing the RPMB key in the host computing system 120. In some embodiments the method further includes an additional block 822 for storing the RPMB key in memory 252 of the data storage device 210.

In some embodiments, the RPMB key will be generated based on the existing keys programmed into the storage device. This has the advantage of preventing a malicious actor from replicating server behavior to introduce new host computing systems 210 to the system 100.

In some embodiments, the method further comprises the step of a second host computing system 120' sending a second shared public key to the access control system 110. The access control system 110 attempts to authorize the second host computing system 120' as in block 804. The method proceeds in a substantially identical sequence as with the first host computing system 120. In some embodiments the system uses a single RPMB key such that each host computing system granted access has an identical RPMB key. In alternative embodiments each host computing system 120 is assigned a unique RPMB key each of which is also programmed into the data storage device 210.

In alternative embodiments, the shared public key is substituted with the MAC address of the host computing system 120 such that the access control system is configured to expect the MAC address. Alternatively, any suitable functional equivalent thereof may be used.

Method of Deactivating a Host from the System

Figure 9:
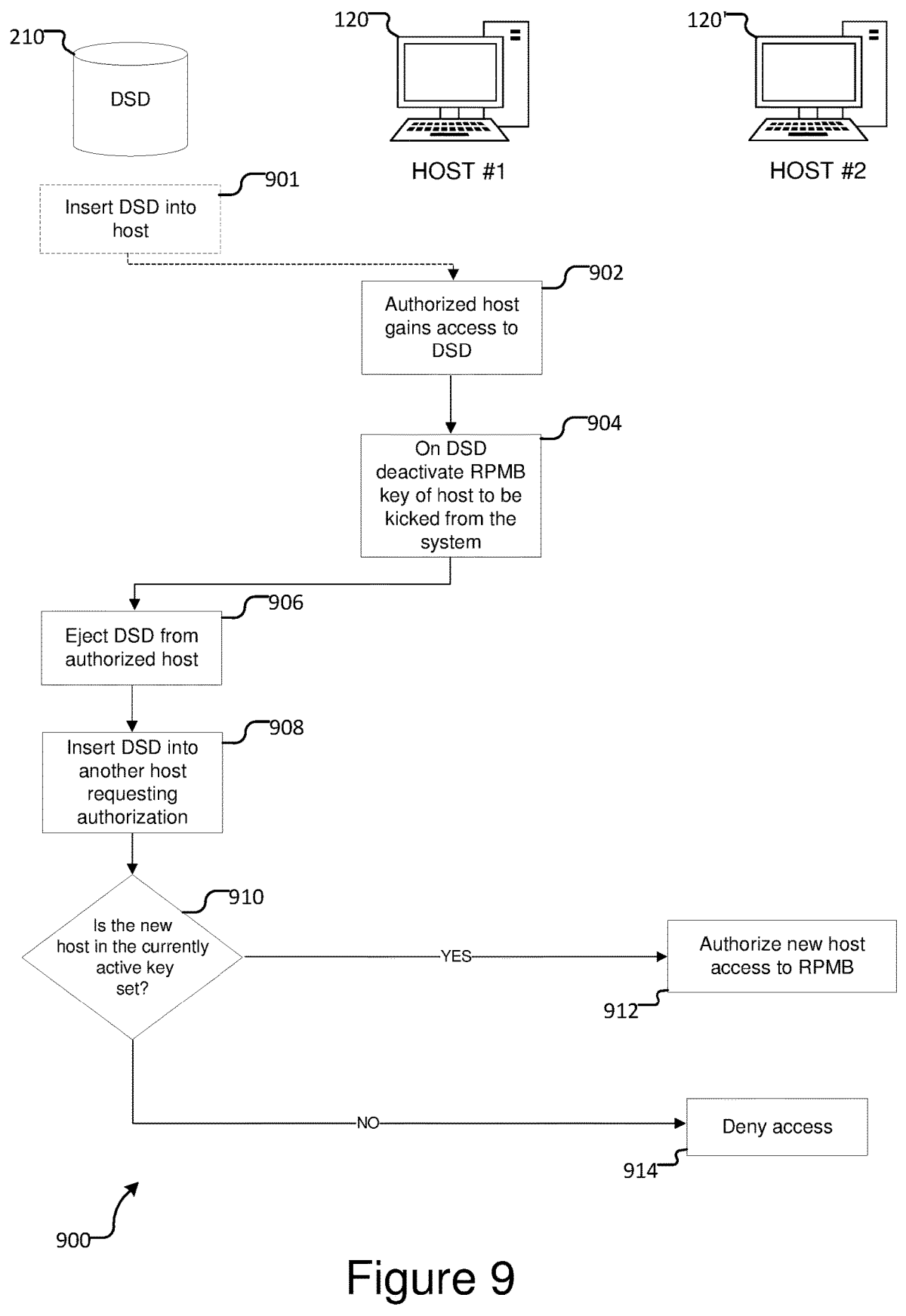

Referring to FIG. 9, the present disclosure provides a method 900 of removing a host computing device 120' from the system 100. In one embodiment, each host computing system 120, 120' of the system 100 is granted a set of privileges. Some host computing systems 120 are granted the right to remove other host computing systems 120 from the system 100 thereby controlling access to RPMB 302.

In some embodiments the method 900 includes an initial block 901 of connecting a first authorized host computing system 120 to a storage device 210, such as by inserting the data storage device into the host.

The method includes block 902 for a first authorized host computing system 120 being enabled write access to the RPMB keys 252. In some embodiments, the data storage device provides settings such that the host computing system has access to an editable list of authorized hosts of the system 100. The method further includes block 904, where the first authorized host computing system 120 deactivates a RPMB key 182 of a second host computing system 120'. In some embodiments, the deactivation may be temporary such that the second host computing system will not be able to access the RPMB 302 for a specified period of time. After this time, the RPMB key of the second host computing system will be reactivated. In alternative embodiments, the RPMB key of the second host computing system is removed such that to re-added the second host computing device 120' to the system 100, it must be done within a secure environment as in the above methods (as though it were a new host).

The method further includes block 906 for disconnecting the data storage device from the first host computing system 120, such as by ejecting the data storage device from the authorized host. The data storage device 210 is then connected to a second host computing system 120'. At block 908, data storage device 210 is inserted into another host requesting authorization, such as second host computing system 120'. At block 910, the data storage device 210 attempts to authorize the second host computing device using the set of active RPMB keys by determining of the new host is in the currently active key set. As the second host computing device 120' was deactivated in step 904, authorization fails and access to the RPMB 302 is denied (block 914).

In alternative embodiments, the method includes block 912 where the data storage device 210 successfully authorizes a third host computing system. In other words, the system 100 was initially comprising three host computing systems and the first host deactivated a second host but the third host retained an active RPMB key.

In some embodiments of method 900 prevents the first host computing system 210 from removing itself from the system 100.

In some embodiments all host computing systems 120, 120' have equal permissions such that every host computing system 120 has the right to kick every other host computing system 120' of system 100.

Alternative Method of Deactivating a Host from the System

Figure 10:
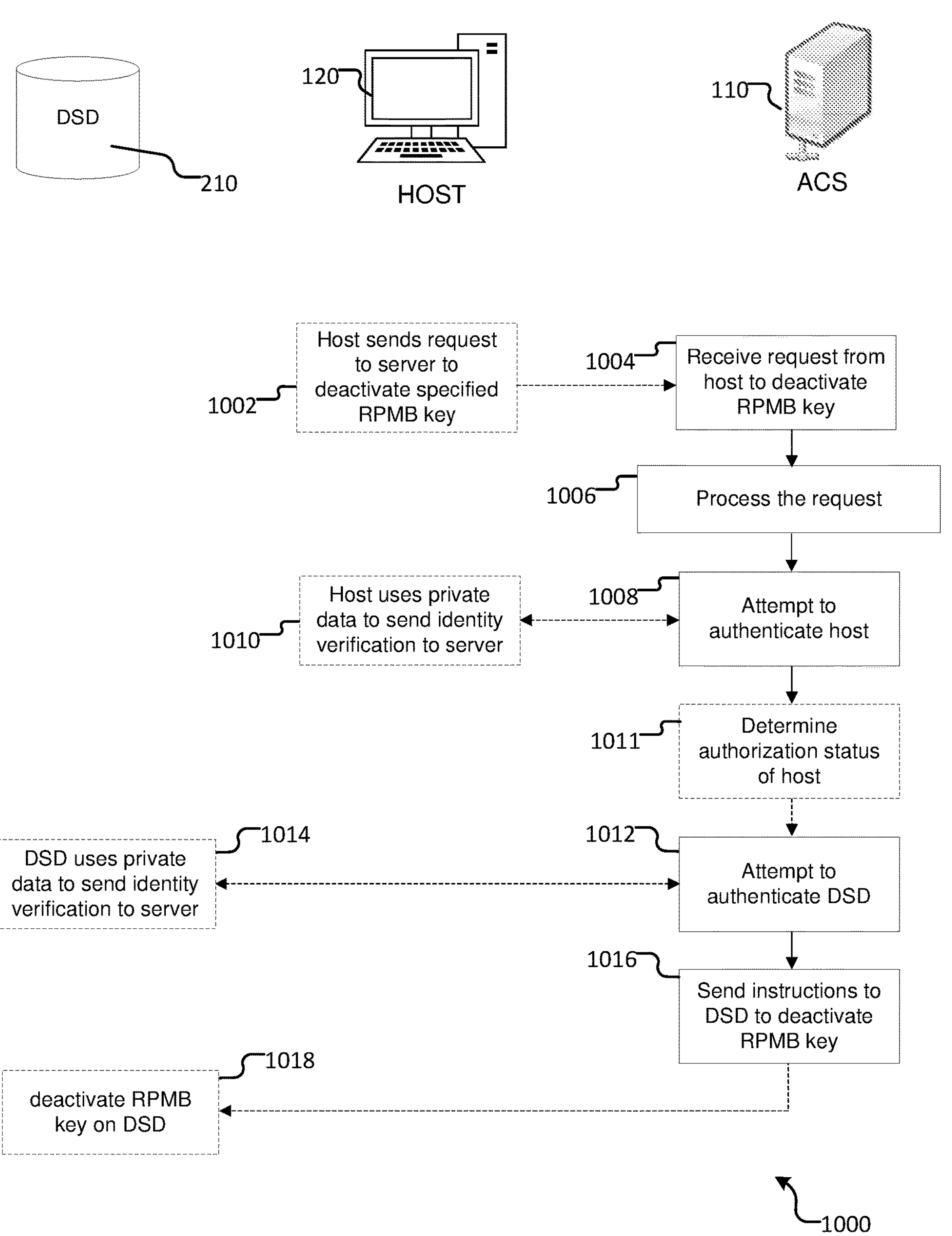
FIG. 10 illustrates a method of removing a host computing system from the system via an access control system.

Referring to FIG. 10, there is provided a method 1000 of a first host computing system 120 removing access of a second host computing system 120' from a data storage device using an access control system (ACS) 110.

In some embodiments, the method 1000 provides block 1002 for a first host computing system 120 to send a request to an access control system 110 to deactivate the RPMB key of a second host computing system 120'.

The method 1000 includes:

Block 1004: An access control system 110 receives a request from a first host computing system 120 to deactivate the RPMB key of a second host computing system 120'.

Block 1006: The access control system 110 processes the request.

Block 1008: The access control system attempts to authenticate the first host computing system 120. In some embodiments, the method 1000 provides block 1010 where the first computing system verifies its identity (as in FIG. 8) with the access control system 110. In further embodiments, the access control system 110 determines, at block 1011, the authorization status of the first host computing system 120 to ensure it is enabled to deactivate other host computing systems.

Block 1012: The access control system 110 attempts authentication of the data storage device 210. In some embodiments, the method includes block 1014, where the data storage device uses a public key shared with the access control system and a private key such that the data storage device can decrypt a signed server key.

Block 1016: The access control system sends a request to the data storage device 210 to deactivate the RPMB key of a second host computing system 120'.

In some embodiments, the method 1000 includes block 1018, where a RPMB key of a second host computing system 120' is deactivated on the data storage device 210.

It is to be appreciated that in some examples of the method 1000, the access control system 110 and the data storage device 210 may communicate directly, or through a network. In other examples of the method 1000, the access control system 110 communicates with the data storage device 210 through a host computing system 120. In yet further examples, the request to a server to deactivate a specified key may be sent by a device, or a terminal, that is not a host computing system 110. Instead, this request may be sent from a node that is associated with an authorized person, or system, to send the deactivation request. The node and or authorized person may be authenticated with steps similar to steps 1010, 1008, and 1011 described above.

Aspects of the present disclosure seek to facilitate a data storage device that can be used by multiple users. This includes selectively enabling access to user data files that correspond to a user whilst preventing access to those files for other users or other actors.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method, executed by at least one processor of an access control system, comprising:

receiving, from a host computing system and over a network, a request to enable access of the host computing system to a Replay Protected Memory Block (RPMB) of a data storage device (DSD), wherein the data storage device is connected by way of a data interface to a bus of the host computing system;

processing the request to determine whether the host computing system is authorized to access the RPMB of the DSD; and in response to determining that the host computing system is authorized to access the RPMB of the DSD:

generating a host-specific RPMB key value that is unique to a combination of a host identifier for the host computing system and a RPBM key of the DSD;

securely programming the host computing system with the host-specific RPMB key value; and securely programming, through the bus of the host computing system, the DSD with the host-specific RPMB key value, wherein the DSD is configured to authenticate, using the host-specific RPMB key value, the host computing system to access the RPMB by way of a data path of the DSD.

2. The method of claim 1, wherein determining whether the host computing system is authorized to access the RPMB of the DSD includes validating:

an identity of the host computing system; and an identity of the DSD.

3. The method of claim 1, wherein securely programming the host computing system and the DSD with the host-specific RPMB key value includes utilizing at least one secure communications channel to transmit the host-specific RPMB key value to the host computing system over the network.

4. The method of claim 1, wherein:

the RPMB key has a predetermined value associated with an identity of the DSD; and generating the host-specific RPMB key value includes retrieving a stored copy of the predetermined value.

5. The method of claim 4, wherein programming the DSD with the RPMB key occurs only once for the predetermined value of the RPMB key.

6. The method of claim 1, wherein securely programming the DSD with the host-specific RPMB key value includes the DSD storing the host-specific RPMB key value in an access key set in a system data partition of the DSD.

7. The method of claim 6, wherein:

the access key set comprises a sequential series of RPMB key values;

the host-specific RPMB key value is generated by processing a preceding RPMB key value of the sequential series of RPMB key values in the access key set of the DSD; and the DSD is configured to authenticate, using respective keys of the access key set, the access of one or more corresponding host computing systems to the RPMB by way of a data path of the DSD.

8. The method of claim 6, further comprising:

determining, for each RPMB key value in the access key set, a corresponding expiration value; and storing the corresponding expiration value with the access key set in the DSD, wherein the DSD is configured to, responsive to receiving an instruction from the host computing system:

compare a current time to the corresponding expiration value for the host-specific RPMB key value; and expire, responsive to the current time exceeding the corresponding expiration value, the host-specific RPMB key value.

9. The method of claim 1, further comprising:

establishing a secure communications channel between the access control system and the host computing system by way of a cryptographically secure message exchange over the network, wherein:

the host-specific RPMB key value is transmitted to the host computing system by way of the secure communications channel; and the host-specific RPMB key value is transmitted to the DSD by the host computing system by way of the data path of the DSD and in response to the host computing system receiving the host-specific RPMB key value from the secure communications channel.

10. The method of claim 1, wherein processing the request to determine whether the host computing system is authorized to access the RPMB of the DSD comprises:

receiving identity data for the host computing system and the DSD;

attempting to authenticate the host computing system based on the identity data for the host computing system;

attempting to authenticate the DSD based on the identity data for the DSD; and determining whether the host has a valid authorization status for access to the RPMB of the DSD.

11. The method of claim 1, further comprising:

receiving, from the host computing system, a public key indicating an access privilege for the RPMB of the DSD;

attempting authorization based on the public key;

sending a signed server key to the host computing system, wherein the host computing system is configured to use a private key to decrypt the signed server key; and receiving, from the host computing system and using the decrypted signed server key, the request to determine whether the host computing system is authorized to access the RPMB of the DSD.

12. The method of claim 1, further comprising, in response to a failure to determine that the host is authorized to access the RPMB of the DSD:

discarding the request received from the host computing system; and generating notification data to notify an external system of the request.

13. A removable data storage device (DSD) comprising:
a non-transitory storage medium configured to store user data, wherein the non-transitory storage medium includes:
a Replay Protected Memory Block (RPMB) formed in a plurality of non-transitory memory cells; and
an access key set;
a data port configured to transmit data between a host computing system and the DSD by way of a data path to a bus of the host computing system; and
a controller configured to:
in response to the access key set including a host-specific RPMB key value, authenticate one or more operations of the host computing system to access the RPMB; and
adjust the access key set in response to one or more key control operations performed on the DSD by an access control system and through the host computing system,
wherein the access control system is configured to:
receive, from the host computing system and over a network, a request to enable access of the host computing system to the RPMB of the DSD;
process the request to determine whether the host computing system is authorized to access the RPMB of the DSD; and
in response to determining that the host computing system is authorized to access the RPMB of the DSD:
generate the host-specific RPMB key value that is unique to a combination of a host identifier for the host computing system and a RPBM key of the DSD;
securely program the host computing system with the host-specific RPMB key value; and
send a secure key programming operation to cause the controller to add the host-specific RPMB key value to the access key set.

14. The removable data storage device of claim 13, wherein sending, by the access control system, the secure key programming operation is performed by the access control system in response to:
receiving, by the access control system and from the host computing system, a public key indicating an access privilege for the RPMB of the DSD;
attempting, by the access control system, authorization based on the public key;
sending, by the access control system, a signed server key to the host computing system, wherein the host computing system is configured to use a private key to decrypt the signed server key; and
receiving, by the access control system and from the host computing system using the decrypted signed server key, the request to determine that the host computing system is authorized to access the RPMB of the DSD.

15. The removable data storage device of claim 13, wherein the host computing system is determined, by the access control system, as authorized to access the RPMB of the DSD in response to a validation of:
an identity of the host computing system and
a device identifier key of the DSD.

16. The removable data storage device of claim 13, wherein:
the RPMB key has a predetermined value associated with an identity of the DSD; and generating the host-specific RPMB key value includes retrieving, by the access control system, a stored copy of the predetermined value.

17. The removable data storage device of claim 13, wherein:
the access key set comprises a sequential series of RPMB key values; and
the host-specific RPMB key value is generated by the access control system processing a preceding RPMB key value of the sequential series of RPMB key values in the access key set of the DSD.

18. The removable data storage device of claim 13, wherein:
the controller is further configured to receive the host-specific RPMB key value by way of a secure communications channel; and
the secure communications channel is established by way of a cryptographically secure message exchange between the access control system and host computing system.

19. The removable data storage device of claim 13, wherein the one or more key control operations includes a secure key removal operation to cause the controller to remove the host-specific RPMB key value from the access key set in response to:
receiving, by the access control system, a request to disable access of the host computing system to the RPMB of the DSD; and
validating, by the access control system, the request to disable access of the host computing system to the RPMB of the DSD.

20. A system comprising:
a removable data storage device (DSD) comprising a non-transitory storage medium configured to store user data, wherein the non-transitory storage medium includes a Replay Protected Memory Block (RPMB) formed in a plurality of non-volatile memory cells;
a host computing system, wherein the DSD is connected by way of a data interface to a bus of the host computing system; and
an access control system in communication with the host computing system over a network and comprising:
at least one memory;
at least one processor;
means for receiving, from the host computing system and over the network, a request to enable access of the host computing system to the RPMB of the DSD;
means for processing the request to determine whether the host computing system is authorized to access the RPMB of the DSD; and
means for, in response to determining that the host computing system is authorized to access the RPMB of the DSD:
generating a host-specific RPMB key value that is unique to a combination of a host identifier for the host computing system and a RPBM key of the DSD;
securely programming the host computing system with the host-specific RPMB key value; and
securely programming, through the bus of the host computing system, the DSD with the host-specific RPMB key value, wherein the DSD is configured to authenticate, using the host-specific RPMB key value, the host computing system to access the RPMB by way of a data path of the DSD.

* * * * *